(12) United States Patent
Schein et al.

(10) Patent No.: US 7,349,371 B2
(45) Date of Patent: Mar. 25, 2008

(54) SELECTING RANDOM ACCESS CHANNELS

(75) Inventors: Brett Schein, Sunnyvale, CA (US);
John S. Chen, San Jose, CA (US)

(73) Assignee: Arraycomm, LLC, San Jose, CA (US)

( * ) Notice: Subject to any disclaimer, the term of this patent is extended or adjusted under 35 U.S.C. 154(b) by 1079 days.

(21) Appl. No.: 10/218,770

(22) Filed: Aug. 14, 2002

(65) Prior Publication Data

US 2003/0133426 A1 Jul. 17, 2003

Related U.S. Application Data

(63) Continuation-in-part of application No. 10/175,707, filed on Jun. 20, 2002, which is a continuation-in-part of application No. 09/675,748, filed on Sep. 29, 2000.

(51) Int. Cl.
*H04Q 7/00* (2006.01)

(52) U.S. Cl. ............... 370/329; 370/342; 370/347; 370/338

(58) Field of Classification Search ............ None
See application file for complete search history.

(56) References Cited

U.S. PATENT DOCUMENTS

| | | | |
|---|---|---|---|
| 5,412,375 A | 5/1995 | Wood | |
| 5,430,761 A | 7/1995 | Bruckert et al. | |
| 5,521,925 A * | 5/1996 | Merakos et al. | 370/337 |
| 5,768,267 A | 6/1998 | Raith et al. | |
| 5,806,003 A | 9/1998 | Jolma et al. | |
| 6,031,832 A * | 2/2000 | Turina | 370/348 |
| 6,321,095 B1 * | 11/2001 | Gavette | 455/517 |
| 6,366,602 B1 | 4/2002 | Raitola | |
| 6,400,695 B1 | 6/2002 | Chuah et al. | |
| 6,539,237 B1 | 3/2003 | Sayers et al. | |
| 6,647,000 B1 | 11/2003 | Persson et al. | |

(Continued)

FOREIGN PATENT DOCUMENTS

EP 0928119 7/1999

(Continued)

OTHER PUBLICATIONS

3rd Generation Partnership Project; Technical Specification Group GSM/EDGE, Radio Access Network; Multiplexing and Multiple Access on the Radio Path, 3GPP TS 05.02 V8.10.0 (Aug. 2001) Release 1999, Section 6.5.1, 3 pps. and Section 6.5.6, 2 pps.

(Continued)

*Primary Examiner*—Duc Ho
(74) *Attorney, Agent, or Firm*—Blakely Sokoloff Taylor & Zafman

(57) ABSTRACT

Embodiment of the present invention can be used to select random access channels to be assigned to user terminals. In one embodiment, the invention includes a base station receiving a signal from a second radio, the received signal containing information about the second radio, and selecting one or more channels to be used by the second radio for random access to the base station using the information about the second radio. Then the base station sends a signal to the second radio, the sent signal containing information about the selected one or more channels.

12 Claims, 9 Drawing Sheets

U.S. PATENT DOCUMENTS

| | | | |
|---|---|---|---|
| 6,697,346 B1* | 2/2004 | Halton et al. ............... | 370/335 |
| 6,772,112 B1* | 8/2004 | Ejzak ........................ | 704/201 |
| 6,978,143 B1* | 12/2005 | Vialen .................... | 455/452.2 |
| 7,027,415 B1 | 4/2006 | Dahlby et al. | |
| 2001/0040883 A1* | 11/2001 | Chang et al. ............... | 370/344 |
| 2002/0071480 A1 | 6/2002 | Marjelund et al. | |

FOREIGN PATENT DOCUMENTS

| | | |
|---|---|---|
| EP | 0928119 A2 | 7/1999 |
| WO | WO-98/14024 | 4/1998 |
| WO | WO98-14024 | 4/1998 |
| WO | WO-9853561 | 11/1998 |
| WO | WO 02/28121 A2 | 4/2002 |

OTHER PUBLICATIONS

3$^{rd}$ Generation Partnership Project; Technical Specification Group GSM EDGE Radio Access Network; General Packet Radio Service (GPRS); Mobile Station (MS)—Base Station System (BSS) Interface; Radio Link Control/Medium Access Control Protocol, 3GPP TS 04.60 V8.9.0 (Apr. 2001), Release 1999, Sections 7 and 8, 46 pps.

"FOA Mailed Jun. 15, 2004 for U.S. Appl. No. 09/675,748".
"FOA Mailed Jun. 23, 2005 for U.S. Appl. No. 09/675,748".
"NALL Mailed Nov. 7, 2006 for U.S. Appl. No. 09/675,748".
"NALL Mailed Dec. 15, 2005 for U.S. Appl. No. 09/675,748".
"NALL Mailed Jun. 16, 2006 for U.S. Appl. No. 09/675,748".
"OA Mailed Jan. 12, 2005 for U.S. Appl. No. 09/675,748".
"OA Mailed Jan. 7, 2004 for U.S. Appl. No. 09/675,748".
"OA Mailed Oct. 7, 2003 for U.S. Appl. No. 09/675,748".
"Office Action Mailed Oct. 5, 2006 for U.S. Appl. No. 10/175,707".
"Office Action Mailed Apr. 26, 2007 for U.S. Appl. No. 10/175,707".
International Search Report, PCT/US03/25052, Aug. 1, 2003.

* cited by examiner

|  | Base Station |  | Remote Terminal |
|---|---|---|---|
| 300 | Acquire GPS Timing |  |  |
| 302 | Determine BCH slot time |  |  |
| 304 |  | BCH⇒ |  |
| 306 |  |  | Scan BCH chanels |
| 308 |  |  | Acquire Frame Timing |
| 310 |  |  | Acquire Synchronization |
| 312 |  |  | Build Map of Base Stations BCHs and BSCCs |
| 314 |  |  | Select Base Station |
| 316 |  |  | Build CR using UTID and transmit power |
| 318 |  |  | Scramble CR using BSCC |
| 320 |  | ⇐ Configuration Request |  |
| 322 | Unscramble CR using BSCC |  |  |
| 324 | Determine Spatial Signature of Remote CR |  |  |
| 326 |  | Configuration Message ⇒ |  |
| 328 |  |  | Adjust timing and power |
| 330 |  | ⇐ Traffic Request |  |
| 332 |  | Traffic Assignment ⇒ |  |
| 334 |  | ⇐ Traffic ⇒ |  |
| 336 |  | ⇐ Send packet ⇒ |  |
| 338 |  | ⇐ Send DA and packet |  |
| 340 |  | ⇐ Send DA and packet |  |
| 342 |  |  |  |

Fig. 8

SELECTING RANDOM ACCESS CHANNELS

CROSS REFERENCE TO RELATED APPLICATIONS

This application is a continuation-in-part of U.S. patent application Ser. No. 10/175,707, filed Jun. 20, 2002, entitled Hopping on Random Access Channels, by Schein, Trott and Chen, and assigned to ArrayComm, Inc., which is a continuation-in-part of U.S. patent application Ser. No. 09/675,748, filed Sep. 29, 2000, entitled Radio Communications System with a Minimal Broadcast Channel, by Uhlik, Youssefmir, Trott and Barratt, and assigned to ArrayComm, Inc., the priorities of which are hereby claimed.

BACKGROUND OF THE INVENTION

1. Field of the Invention

The present invention applies to radio communications systems in which several remote terminals communicate voice or data with a base station and, in particular, to such systems in which the base station selects channels to be used by the remote terminals for random access.

2. Description of the Prior Art

Mobile radio communications systems such as cellular voice radio systems typically have a base station available for use by mobile remote terminals, such as cellular telephones or wireless web devices. The base station typically transmits a broadcast channel (BCH). The BCH is broadcast to all remote terminals whether they are registered on the network or not and informs the remote terminals about the network. In order to access the network, a remote terminal must normally tune to and listen to the BCH before accessing the network. A remote terminal will typically scan a range of likely frequencies when it wants to access the network until it finds the strongest BCH, it will then use the information in the BCH to access the network.

The BCH is typically filled with data about the network in order to reduce the amount of information that must be transmitted to any particular remote terminal in the accessing, registering, authenticating or logging-on process. As a result, after registration, the remote terminal does not require any further information other than a specific channel assignment from the already known channel set in order to initiate a call.

The broadcast channel is typically transmitted at a relatively high power level so that any remote terminal in any location within the range of the base station can receive it clearly. The high power level and the high data rate in combination make it likely that the broadcast channel will interfere with other traffic channels of the radio communications system. When there are several different base stations transmitting on one or more broadcast channels, the possibility of and amount of interference is greater.

The present invention reduces the interference caused by the broadcast channel. This allows less of the channel resources to be dedicated to the broadcast channel and more of the channel resources to be dedicated to the traffic channels. In one embodiment, the broadcast channel is transmitted to all remote terminals that enter within the range of the base station while other communications are transmitted directly to the intended remote terminal on a channel that creates much less interference with other remote terminals. In such an embodiment, the present invention, by transmitting less data on the broadcast channel and more data on a specifically directed channel, reduces broadcast channel interference still more.

BRIEF SUMMARY OF THE INVENTION

Embodiment of the present invention can be used to select random access channels to be assigned to user terminals. In one embodiment, the invention includes a base station receiving a signal from a second radio, the received signal containing information about the second radio, and selecting one or more channels to be used by the second radio for random access to the base station using the information about the second radio. Then the base station sends a signal to the second radio, the sent signal containing information about the selected one or more channels.

BRIEF DESCRIPTION OF THE DRAWINGS

The present invention is illustrated by way of example, and not by way of limitation, in the figures of the accompanying drawings in which like reference numerals refer to similar elements and in which:

FIG. 8 is a diagram illustrating a communications sequence according to one embodiment of the present invention;

DETAILED DESCRIPTION OF THE INVENTION

Basic Structure

Figure 1:
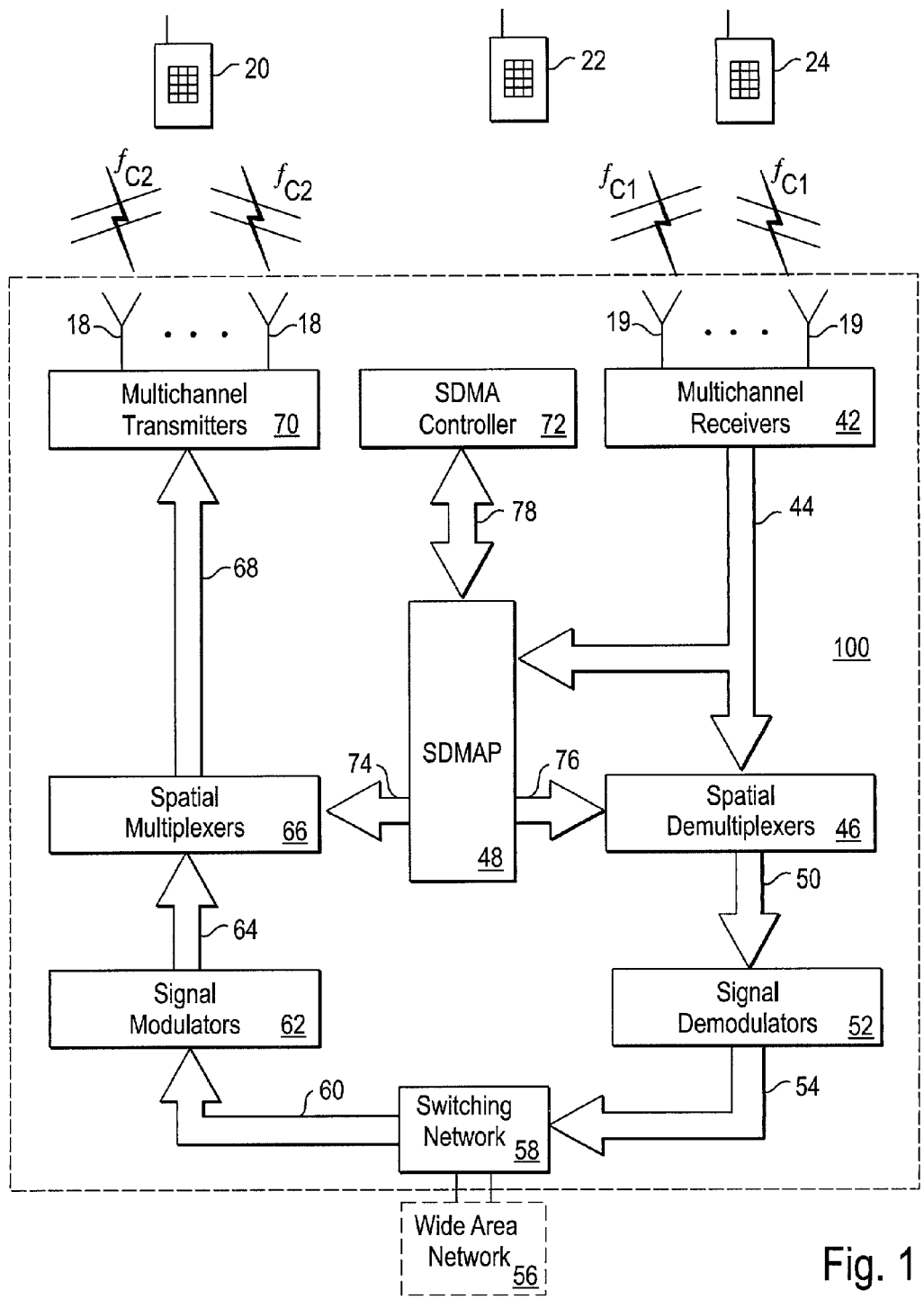
FIG. 1 is a diagram illustrating an exemplary architecture of a wireless communication system according to one embodiment of the present invention.
Figure 2:
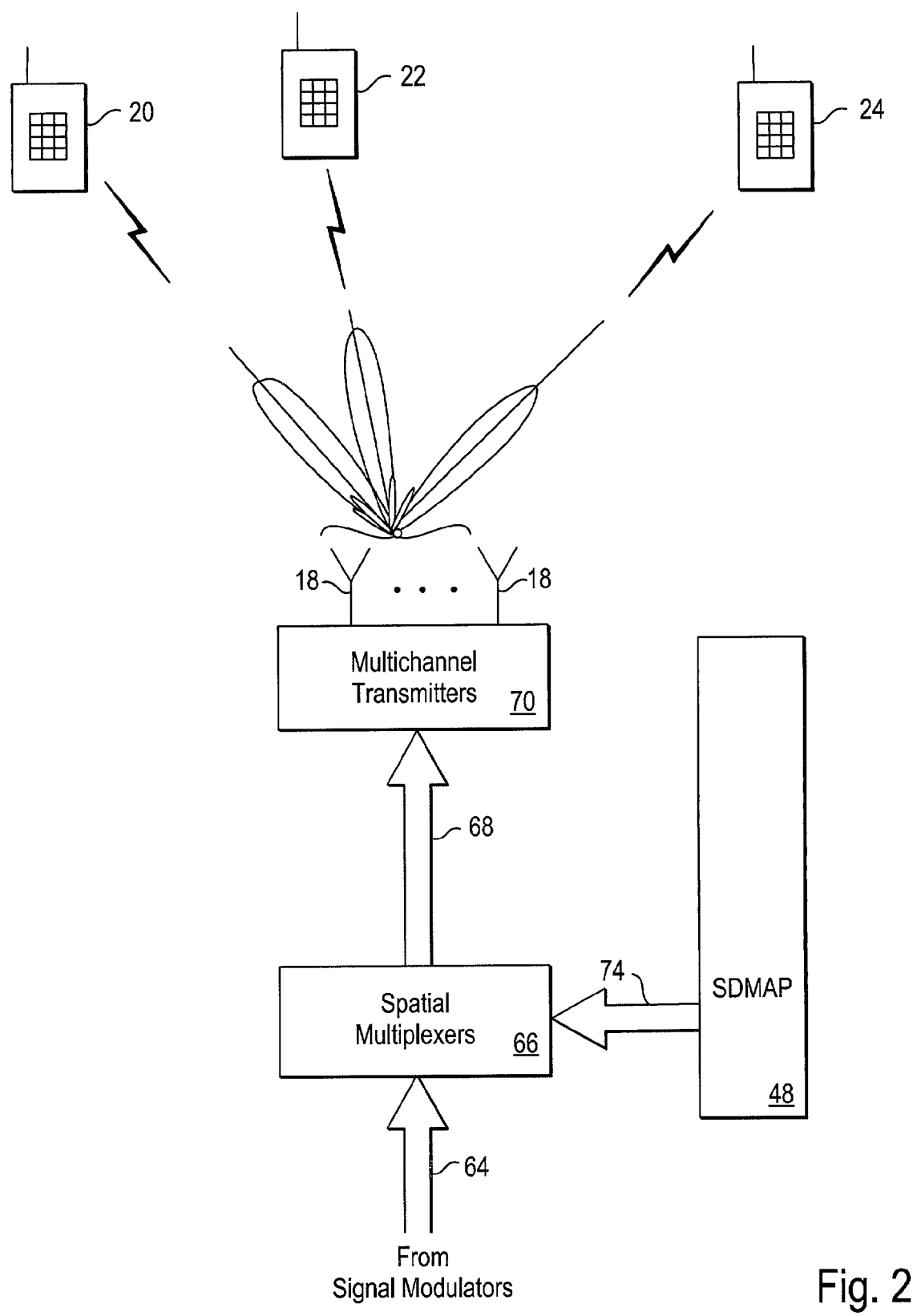
FIG. 2 is a diagram illustrating transmission patterns of a multi-channel spatial diversity transmitter according to one embodiment of the present invention.

FIG. 1 shows an example of a wireless communications system or network in which a number of subscriber stations, also referred to as remote terminals or user terminals, (symbolically shown as handsets) 20, 22, 24, are being served by a base station 100 that may be connected to a wide area network (WAN) 56 for providing any required data services and connections external to the immediate wireless system. The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). A switching network 58 interfaces with a WAN 56 for providing multi-channel duplex operation with the WAN by switching incoming WAN data to lines 60 of the base station 100 and switching outgoing signals from the base station 100, on lines 54 to the WAN. Incoming lines 60 are applied to signal modulators 62 that produce modulated signals 64 for each subscriber station to which the base station is transmitting. A set of spatial multiplexing weights for each subscriber station are applied 74 to the respective modulated signals in spatial multiplexers 66 to produce spatially multiplexed signals 68 to be transmitted by a bank of multi-channel transmitters 70 using a transmit antenna array 18. The SDMA processor (SDMAP) 48 produces and maintains spatial signatures for each subscriber station for each conventional channel, calculates spatial multiplexing and demultiplexing weights for use by spatial multiplexers 66, and spatial demultiplexers 46, and uses the received signal measurements 44 to select a channel for a new connection. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. An example of a transmit antenna pattern that may be created is shown in FIG. 2. Suitable technologies for achieving such a spatially directed beam are described, for example, in U.S. Pat. Nos. 5,828,658, issued Oct. 27, 1998 to Ottersten et al. and 5,642,353, issued Jun. 24, 1997 to Roy, III et al.

Returning to FIG. 1 spatial demultiplexers 46 combine received signal measurements 44 from the multi-channel receivers 42 and associated antenna array 19 according to spatial demultiplexing weights 76, a separate set of demultiplexing weights being applied for each subscriber station communicating with the base station. The outputs of the spatial demultiplexers 46 are spatially separated signals 50 for each subscriber station communicating with the base station. In an alternate embodiment, the demultiplexing and demodulation processing are performed together in a nonlinear multidimensional signal processing unit. The demodulated received signals 54 are then available to the switching network 58 and the WAN 56. The multi-channel receivers also receive timing signals from GPS (Global Positioning System) satellites or some other radio precision timing signal which is then provided to the SDMAP for precise timing that is synchronized across all base stations in the system.

In an FDMA system implementation, each multi-channel receiver and each multi-channel transmitter is capable of handling multiple frequency channels. In other embodiments, the multi-channel receivers 42 and multi-channel transmitters 70 may instead handle multiple time slots, as in a TDMA system, multiple codes, as in a CDMA system, or some combination of these well-known multiple access techniques.

Figure 3:
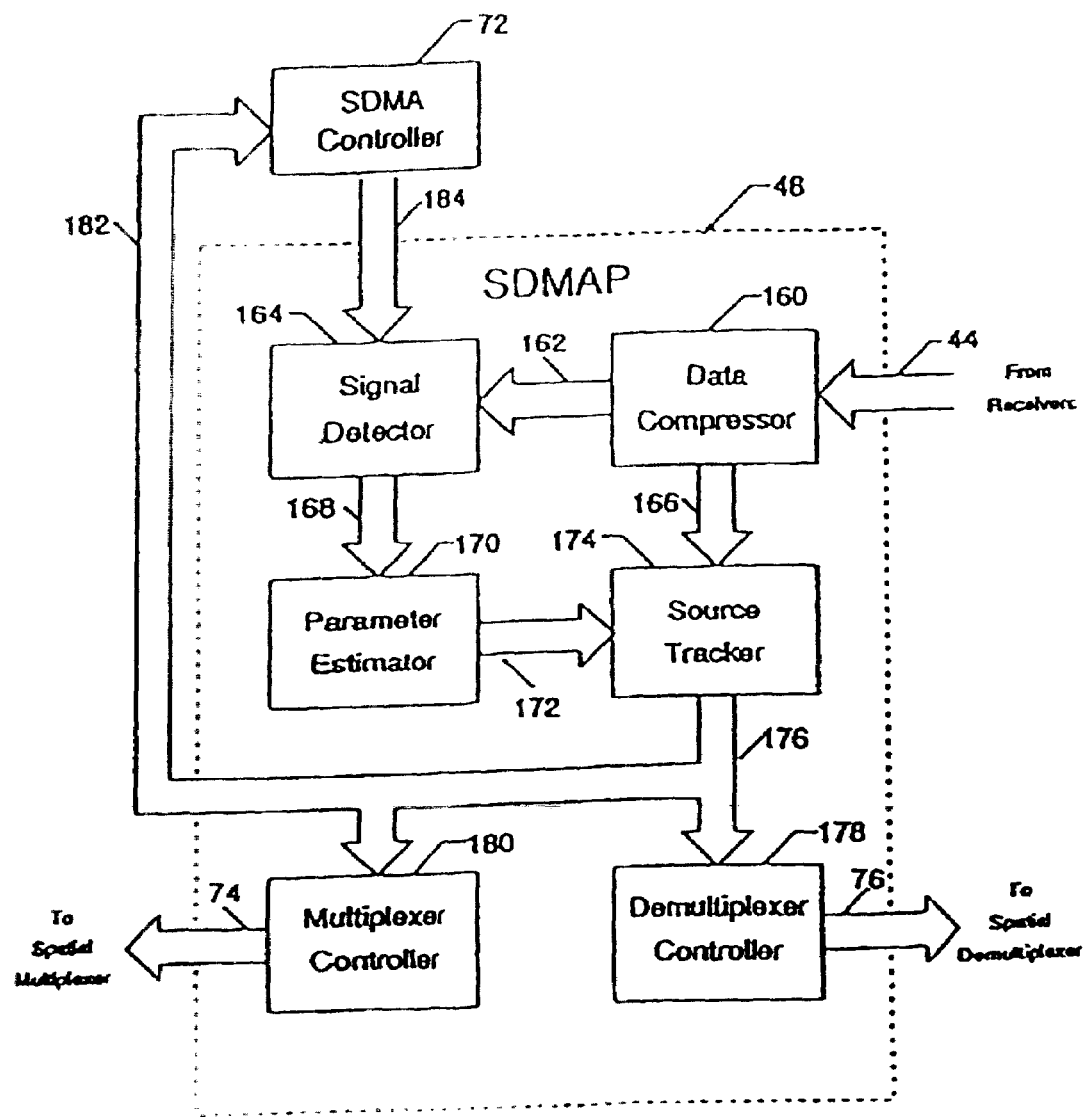
FIG. 3 is a block diagram illustrating a spatial diversity multiple access processor according to one embodiment of the present invention.

FIG. 3 shows a breakdown of a Spatial Division Multiple Access signal Processor (SDMAP) 48. The function of the SDMAP includes determining how many signals are present in a particular channel, estimating signal parameters such as the spatial location of the transmitters (i.e., directions-of-arrival (DOAs) and distance from the base station), and determining the appropriate spatial demultiplexing and multiplexing schemes. The inputs 44 to the SDMAP include outputs of base station receivers, one for each receiving antenna. In one embodiment, the receivers perform quadrature detection of the signals as in current systems, in which case there are in-phase (I) and quadrature (Q) components (signals) output from each channel behind each antenna. In another embodiment, a single down-converted component, I or Q or any combination thereof, is used. In one embodiment, the receivers digitize the data before passing it to the SDMAP. In another embodiment, digitization is performed in the data compressor 160.

In one embodiment of the invention, the SDMAP accomplishes its task by first obtaining estimates of important signal related parameters such as their directions-of-arrival (DOAs) without exploiting temporal properties of the signal. This is appropriate, for example, in situations where analog modulation schemes are employed and little is known about the signal waveform. In a second embodiment, known training sequences placed in digital data streams for the purpose of channel equalization can be used in conjunction with sensor array information to calculate signal parameter estimates such as DOAs and signal power levels. This information is then used to calculate appropriate weights 76 for a spatial demultiplexer, implemented in this embodiment as a linear combiner, i.e., a weight-and-sum operation. In a third embodiment, time-of-arrival (TOA)-related parameters from the parameter estimator are used in conjunction with signal correlation parameters to ascertain which signals are multi-path versions of a common signal. Relative delays are then calculated such that the signals can be coherently combined, thus further increasing the quality of the estimated signals.

However, in another embodiment of this invention, the function of the spatial demultiplexer is performed in conjunction with the estimation of other source parameters such as the DOAs. As an example of one such embodiment of this type, the constant modulus property (i.e., constant amplitude) of various communication signals such as digital phase-shift-keyed (PSK) and analog FM waveforms can be exploited along with properties of the array of receiving antennas to simultaneously estimate the source waveforms as well as their DOAs using multi-channel constant-modulus algorithms (CMA) which are well-known in the art.

In another embodiment, extended Kalman filters, also well-known in the art, can be used to exploit these and similar properties. In these and similar embodiments, the function of the spatial demultiplexer 46 is assumed by the SDMAP 48, and the outputs 76 of the SDMAP are the spatially demultiplexed signals to be sent to the demodulators.

Referring again to FIG. 3, data compression 160 is performed to reduce the amount of data, and, in one embodiment, consists of accumulation of a sample covariance matrix involving sums of outer products of the sampled receiver outputs in a particular channel. Hereafter, these sampled outputs are referred to as data vectors, and there is one such data vector at each sample time for each of the channels assigned to a particular base station. In another embodiment, the compressed data are simply the unprocessed data vectors. If I and Q signals 44 are output from the receivers, each data vector is a collection of mr complex numbers, one for each of the mr receiver/antenna pairs.

In a third embodiment, data compression also includes using known signal information such as training sequences present in wireless digital systems and mobile unit transponder responses in current analog systems to calculate time-of-arrival (TOA) of a distinct periodic signal feature, a parameter containing valuable information related to the distance between cell sites and the wireless transmitter which is exploited in this embodiment.

Compressed data 162 are passed to a signal detector 164 for detection of the number of signals present in the channel. In one embodiment, statistical detection schemes are employed in conjunction with information from a SDMA controller 72 to estimate the number of sources present in the channel. This information and the (compressed) data 168 are sent to a parameter estimator 170 where estimates of signal parameters including those related to the source locations (e.g., DOAs and range) are obtained.

Location-related parameter estimates 172 are passed to a source tracker 174. In one embodiment, the function of the source tracker is to keep track of the positions of each of the transmitters as a function of time. This is implemented by known nonlinear filtering techniques such as the aforementioned extended Kalman filter (EKF). In another embodiment, velocities and accelerations of each of the wireless units in a particular channel are tracked as well. Inputs to the EKF in one embodiment include the DOAs and TOAs from the local base station. In another embodiment, DOA and TOA measurements from other nearby cell sites also receiving transmissions from the mobile units are incorporated along with known locations of the cell sites to further improve the estimation accuracy of the EKF as is well-known in the art. The tracker 174 outputs are sent along with the (compressed) data 176 to a spatial demultiplexer controller 178, to control the function of the spatial demultiplexer, and to a spatial multiplexer controller 180 to control the function of the spatial multiplexer.

Figure 4:
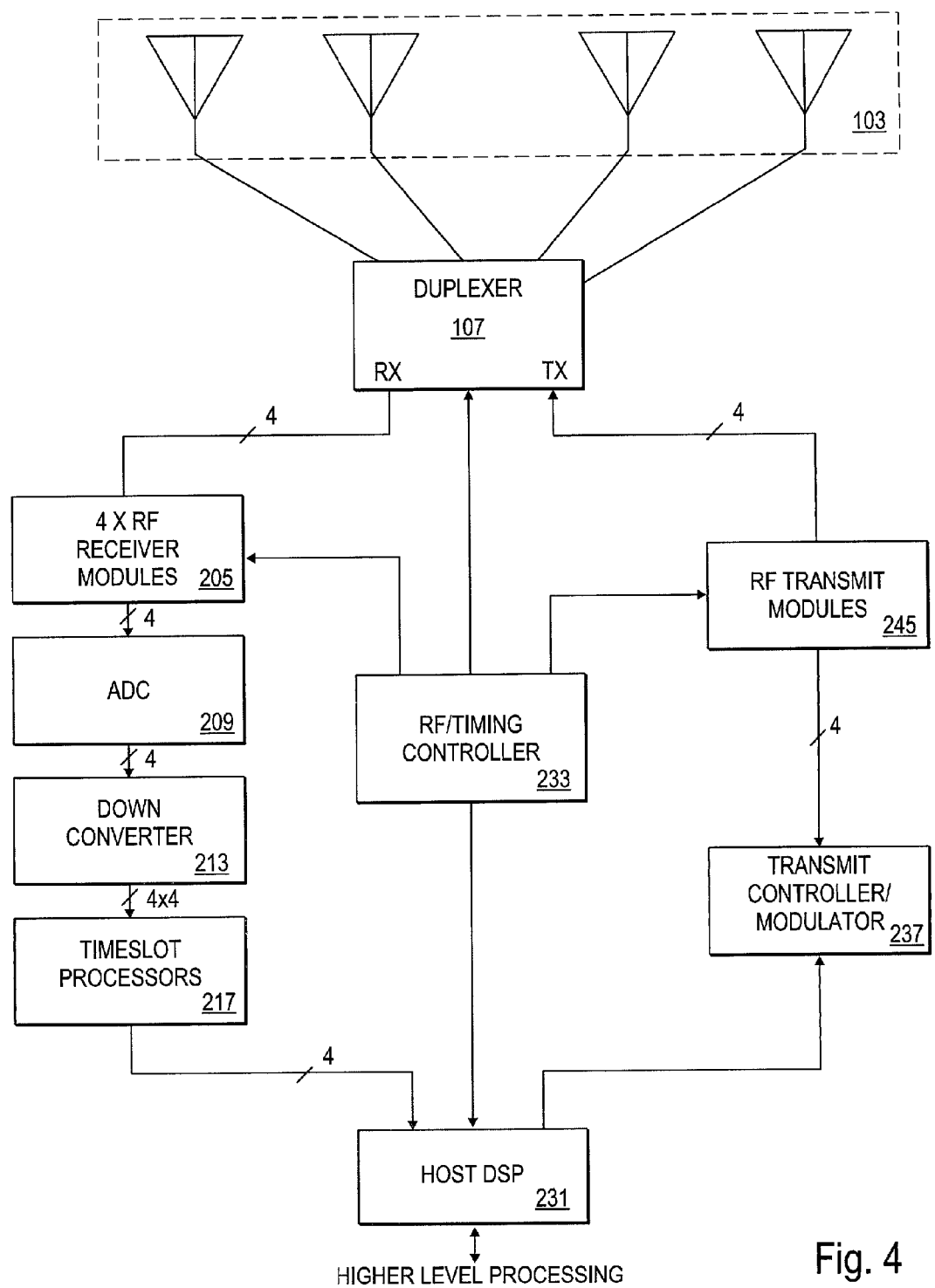
FIG. 4 shows a simplified block diagram of a base station on which an embodiment of the invention can be implemented.

FIG. 4 shows an alternative embodiment of a wireless communications system suitable for implementing the present invention. This system is typically coupled to a switching network and WAN similarly to the system of FIG. 1 such as switching network 58 and WAN 56. In FIG. 4, a plurality of antennas 103 is used, for example four antennas, although other numbers of antennas may be selected. The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency (for example around 1.9 GHz) to an FM intermediate frequency ("IF") of, for example, 384 kHz. This signal then is digitized (sampled) by analog to digital converters ("ADCs") 209 at, for example, 1.536 MHz. Only the real part of the signal is sampled. Thus, in complex phasor notation, the digital signal can be visualized as containing the complex valued IF signal at 384 kHz together with an image at −384 kHz. Final down-converting to baseband is carried out digitally by multiplying the 1.536 megasamples per second real-only signal by a 384 kHz complex phasor. The result is a complex valued signal that contains the complex valued baseband signal plus an image at, for example, −2×384=−768 kHz. This unwanted negative frequency image is filtered digitally to produce the complex valued baseband signal sampled at 1.536 MHz. GrayChip Inc. GC2011 digital filters can be used to implement the down-converting and the digital filtering, the latter using finite impulse response (FIR) filtering techniques. This is shown as block 213. The particular frequencies suggested above are provided by way of example. The invention can be adapted to suit a wide variety of RF and IF carrier frequencies and bands.

There are, in the present example, four down-converted outputs from each antenna's GC2011 digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola DSP56303 DSPs can be used as timeslot processors, one per receive timeslot.

The timeslot processors 217 perform several functions including the following: received signal power monitoring; frequency offset estimation and time alignment; smart antenna processing including determining weights for each antenna element to determine a signal from a particular remote user; and demodulation of the determined signal.

The output of the timeslot processor 217 is demodulated burst data for each of the four receive timeslots. This data is sent to a host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56303. In addition, timeslot processors send the determined receive weights to the host DSP 231. The main functions of the host DSP 231 specifically include:

maintaining state and timing information;
receiving uplink burst data from the timeslot processors 217;
programming the timeslot processors 217;
processing the uplink signals, including de-encrypting, de-scrambling, error correcting code checking, and burst deconstruction of the uplink;
formatting the uplink signal to be sent for higher level processing in other parts of the base station;
formatting service data and traffic data for further higher processing in the base station;
receiving downlink messages and traffic data from the other parts of the base station;
processing of downlink bursts (burst construction, encoding, scrambling and encryption);
formatting and sending downlink bursts to a transmit controller/modulator, shown as 237;
programming the transmit controller/modulator 237, including determining and sending transmit weight vectors to the transmit controller/modulator 237;
controlling the RF controller shown as 233; and
maintaining and reporting modem status information, and controlling synchronization.

The RF controller 233 interfaces with the RF system, shown as block 245 and also produces a number of timing signals that are used by both the RF system and the modem. The specific tasks performed by the RF controller 233 include:

producing timing signals for the RF system (RX and TX) and other parts of the modem;
reading transmit power monitoring values;
writing transmit power control values;

producing the duplexer 107 switch box control signal; and reading automatic gain control (AGC) values.

the RF controller 233 receives timing parameters and other settings for each burst from the host DSP 231.

The transmit controller/modulator 237, receives transmit data from the host DSP 231, four symbols at a time. The transmit controller uses this data to produce analog IF outputs which are sent to the RF transmitter (TX) modules 245. The specific operations transmit controller/modulator 237 performs are:

converting data bits into a complex modulated signal;

up-converting to an IF frequency using, for example, a GrayChip 2011;

4-times over-sampling the IF signal;

multiplying this 4-times over-sampled complex signal by transmit weights obtained from host DSP 231; and converting the real part of the resulting complex valued waveforms via digital to analog converters ("DACs") which are part of transmit controller/modulator 237 to analog transmit waveforms which are sent to the transmit modules 245.

The transmit modules 245 up-convert the signals to the transmission frequency and amplify the signals. The amplified transmission signal outputs are sent to antennas 103 via the duplexer/time switch 107.

Broadcast Channel (BCH)

Figure 5:
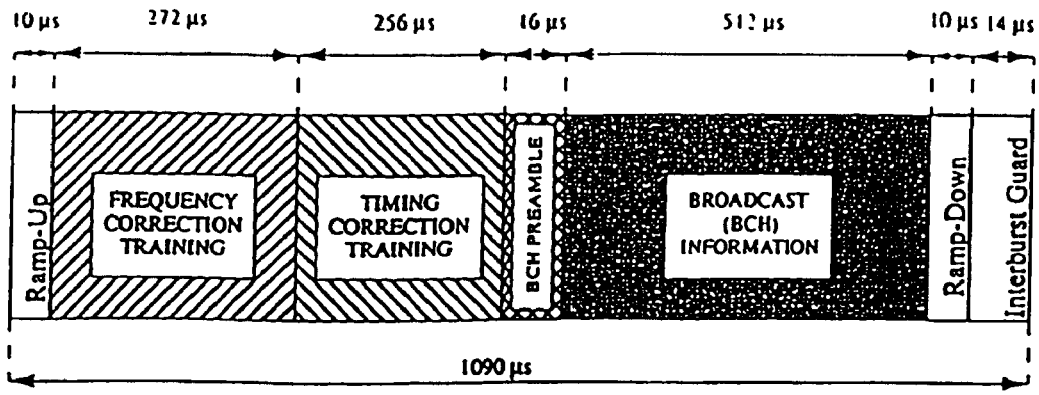
FIG. 5 is a diagram illustrating an example of a broadcast burst structure according to one embodiment of the present invention.

The system of the present invention is initiated for each user terminal or remote terminal from the broadcast channel BCH which is transmitted as a burst from the base station to all potential user terminals. The BCH burst, unlike the traffic channel bursts, is transmitted in all directions where user terminals may be, typically omnidirectionally but the specific beam pattern will depend on the network. Accordingly, the BCH burst will create more interference on the system than spatially directed or lower power traffic channels TCH. For this reason, the data and modulation properties of the BCH channel are selected to minimize interference. An example of a broadcast burst structure is shown in FIG. 5. Some of the important BCH burst properties are as follows. The BCH is computationally easy to find by scanning in real time having no knowledge of time-slot boundaries. It communicates enough basic information to enable a subsequent exchange of configuration request CR and configuration message CM between the base station and the user terminal. The BCH also provides good frequency offset and timing update information to all user terminals, even when the BCH is not specifically directed toward any one user terminal in particular.

Table 1 below summarizes the content of an example of a BCH burst, as shown in FIG. 5.

TABLE 1

| Duration | Contents |
| --- | --- |
| 10 μsec | ramp-up |
| 272 μsec | frequency correction training symbols $f_1, f_2, \ldots, f_{136}$ |
| 256 μsec | timing correction training symbols $t_1, t_2, \ldots t_{128}$ |
| 16 μsec | broadcast preamble $r_1, r_2, \ldots r_8$ |
| 512 μsec | information symbols $h'_1, h'_2, \ldots h'_{256}$ |
| 10 μsec | ramp-down |
| 14 μsec | inter-burst guard time |

The frequency and timing correction training symbols can be set according to any one of many approaches well-known in the art. They can also be combined, exchanged with a synchronization sequence or eliminated.

The broadcast information symbols are constructed from a 15-bit broadcast message which is modulated and coded into a 256 bit sequence. The number of symbols as well as the structure and sequence of transmitted bits can be varied to suit a wide variety of applications. The presently described embodiment has been selected in order to minimize the amount of information transmitted in the BCH as well as to minimize the bit rate. The broadcast channel information symbols provide the information needed for a user terminal to request a configuration message from the base station. They also provide information to guide user terminal handover decisions.

Each broadcast message is mapped into a broadcast burst with the information shown below in Table 2.

TABLE 2

| Broadcast Message | |
| --- | --- |
| Field | # of Bits |
| BStxPwr | 5 |
| BSCC | 7 |
| BSload | 3 |
| Total | 15 |

BStxPwr is the effective isotropic radiated power of the broadcast message. This number indicates the power transmitted by the base station taking into account the number of amplifiers and diversity antennas available at the base station. For a 10 antenna broadcast channel, base station power=(2·BStxPwr+10) dBm.

BSCC is the base station color code, used by the user terminal to select training data for uplink bursts and to distinguish broadcasts of different base stations. In one embodiment, there are up to 128 different possible color codes. The color codes can be used to indicate a base station in a different location or a different modulator/demodulator set in the same location.

BSload is the load on the base station, used by the user terminal to determine how frequently to send random access messages. BSload is an indication of the amount of unused capacity the base station has. It can be different from the number of active registered subscribers because subscribers can require different amounts of traffic capacity. BSload represents the transmit and receive bit rates of each modem of the base station over a period of a few minutes measured against maximum possible loading.

In one embodiment, the BCH channel is shared by all base stations in the wireless communication system. Using the 7 bit BSCC, up to 128 base stations can be accommodated. The BCH is a time division duplex channel with a repeating frame. The channel is a single RF carrier frequency used for uplink and downlink. For high noise environments or for increased robustness, the BCH can hop frequencies according to a predetermined scheme or be repeated on several different frequencies. The repeating frame includes the downlink BCH for each base station, labeled BS1 etc. as shown in Table 3 below. The next frame includes the uplink Configuration Request CR, labeled CR1 etc. and downlink Configuration Message CM, labeled CM1 etc. Each frame also includes a number of reserved slots, shown as empty boxes below. These slots can be used for data traffic, if the broadcast channel is also used for traffic, for other control messages or reserved to reduce interference on other channels in the network. The frames are repeated for each respective base station 1 to 128 to build a superframe as discussed in more detail below. After the last CM, CM128, the superframe repeats and begins again with the next superframe and the BCH for base station 1.

TABLE 3

|  |  | Uplink | Downlink |
|---|---|---|---|
| Superframe 1 | Frame 1 |  | BS1 |
|  | Frame 2 | CR1 | CM1 |
|  | Frame 3 |  | BS2 |
|  | Frame 4 | CR2 | CM2 |
|  | . | . | . |
|  | . | . | . |
|  | . | . | . |
|  | Frame 255 |  | BS128 |
|  | Frame 256 | CR128 | CM128 |
| Superframe 2 | Frame 1 |  | BS1 |
|  | Frame 2 | CR1 | CM1 |
|  | . | . | . |
|  | . | . | . |
|  | . | . | . |

A base station can be considered a collection of base station modems serving a group of contiguous RF carriers. Alternatively, a base station can be an installation with a set of modems at a single site. For other system configurations each modem modulator/demodulator set 52, 62 can be considered a base station. Each base station is assigned a unique 32-bit base station identifier, BSID. The BSID is used to derive a base station color code as follows: BSCC=BSID mod 128. As a function of the BSCC, a base station frequency hops, broadcasts BCH, listens for uplink CR, and sends downlink CM. Within a geographical region where radio transmissions overlap, the BSID should be assigned so that the BSCC is uniquely assigned. No base station should be able to routinely see user terminals that are communicating with a base station of the same color code. Likewise, no user terminal should be able to see two base stations that are assigned the same BSCC. The total number of base stations as well as the number of frames in a superframe, the number of slots in a frame and the particular slots used for transmitting BCH bursts, CRs and CMs can be modified to suit particular applications.

To minimize, the data rate of BCH bursts still further, the BSCC and BSload can be removed from the BCH burst. The BCH burst then contains only training or synchronization and BStxPwr, the only information directly related to handover decisions. The user terminal can still distinguish and compare different base stations for selection and handover decisions based on timing of the received BCH bursts. The user terminal can also direct its CR message to a specific base station as shown in Table 3 based on timing. For a single base station system, the BStxPwr bits can also be deleted. If there is only one base station, it is not necessary to evaluate path loss but only whether the signal can be received. The rest of the network information can be learned upon registration, described below. Alternatively, since the BCH includes the BSCC, the user terminal can be programmed to read the BSCC and assume that BCH bursts with a common BSCC are from the same base station. In this way, the user terminal can learn a shortened frame repetition interval, and reduce the time needed to register with the system.

Registration

A user terminal forms a relationship with a base station called a registration. This registration begins by listening to the broadcast channel and ends with a handover, timeout, or disconnection. The first step of registration is accomplished by a remote by sending the Configuration Request burst CR and receiving a Configuration Message burst CM. The CM contains basic configuration parameters such as hopping sequence calculation parameters. Using the information from the CM, the user terminal then opens an unauthenticated stream using a random access registration request RA-rreq. This unauthenticated stream carries only in-band signaling data used to complete registration and assignment of a registration identifier RID and paging identifier PID. Using the RID assigned at the end of the registration stream, the user terminal can open subsequent streams and it can end registrations. The user terminal can also open subsequent streams in which it can send packets which are used to perform "network login" to an Internet Service Provider (ISP).

During the registration stream, identities and capabilities are exchanged, operating parameters are set, and a RID and PID are assigned. Later, a new network session may be created and attached to this RID, or an existing session may be handed over. This handover may be from another base station, another base station modem on the same base station (load shifting), or even from a hibernating session on the same base station modem. The specific details of registration are provided here as examples only. Many other registration scenarios are also possible within the scope of the present invention.

Referring to FIG. 8, the frame timing is established by the base stations that are in the area and transmitting on a pre-programmed RF carrier. The carrier may be a frequency hopping or spread spectrum carrier. However, it is preferred that the carrier be easy to find and be pre-programmed into the user terminals. The base stations, or base station if there is only one, employ GPS or some other precise common timing reference to establish the frame timing 300. GPS timing offers the advantage that it is accurately synchronized and inexpensively available to all base stations. This allows the BCH to be shared by all the base stations with only a minimal guard time in the BCH between base stations. The base stations then build the BCH frame 302 described above and broadcast in their respective assigned slots 304. When a user terminal turns on, it scans this well-known, optionally pre-programmed, RF carrier 306 to find basic frame timing 308 and synchronization 310. The user terminal scans this carrier for BCH bursts, building an RSSI (Received Signal Strength Indicator) map 312. From this BCH RSSI map and other factors, the user terminal selects the strongest or the best base station 314. It also uses the BCH to precisely adjust its oscillator frequency and adjust its frame timing reference 308, 310. This is done using the synchronization and timing sequences in the BCH burst, described above. Then, using its user or remote terminal ID (UTID) it builds 316 and sends 320 a Configuration Request CR, timed relative to the BCH burst for that strongest or best base station. In one embodiment, the CR is scrambled using the BSCC that was received in the BCH from the selected base station 318.

If the intended base station successfully receives the CR and has available capacity, it unscrambles the CR 322, and determines the spatial signature of the user terminal 324. The user terminal receives a Configuration Message burst CM in reply 326. The CM, described in greater detail below, contains sufficient information for the user terminal to learn its distance and RF path-loss to the base station, correct its timing advance, adjust its power control, and learn the parameters of frequency hopping (e.g. frame numbering and BSCC) 328. Several base stations may be probed with a CR to find the closest or the best base station. Based on this information from the CM, the user terminal, when it has data to transmit, can start a session, beginning with a random access registration request RA-rreq 330. If resources are available, the base station sends an Access Assignment AA 332 to the user terminal assigning a traffic channel. The base station and user terminal exchange various access control parameters including encryption keys on this established stream. Finally a RID and PID are assigned. Using this RID, the user terminal can establish secure streams (e.g. RA-rts/AA-cts) in which it transmits and receives internet packets 334.

The traffic channel includes a data acknowledgement DA or a data invalid DI response to each transmitted data packet. The DA and DI messages are transmitted as a part of the next data packet from the recipient in the next slot. In a time division duplex frame, the base station and the user terminal alternate slots 336, 338, 340, 342, as shown in FIG. 8. Accordingly, if any slots are not received properly, the data can quickly be retransmitted. This reduces the size of the data buffers at the respective base station and user terminal modems. As shown in Tables 3 and 4 uplink slots always precede downlink slots and there is a guard time between the two in order to allow for any synchronization errors or unanticipated propagation delays. In one embodiment, each side transmits data packets in three slots, each slot including ramp-up and ramp-down periods as well as synchronization bits as is well-known in the art.

TABLE 4

| 1 | 2 | 3 | | 1 | 2 | 3 | | 1 | 2 | 3 | ... |
|---|---|---|---|---|---|---|---|---|---|---|---|
| Uplink Slots | | | Guard Time | Downlink Slots | | | Guard Time | Uplink Slots | | | |

Periodically, the user terminal scans the BCH to update its RSSI and BSCC map. When it detects a better base station, it may send a CR to this new base station and possibly handover its network session. If successful stream initiation fails too many times, the user terminal enters a timeout state. From timeout, it may try to regain a RID via RA-rreq, refresh its timing advance using a CR, find a new base station to which it might handover by scanning the BCH, or even begin from scratch to re-acquire basic frame timing. If this re-establishment is successful, the user terminal may be able to continue its network session by completing a network session handover to the new base station.

Channel Considerations

In one embodiment, the network is designed to take maximal advantage of spatial division multiple access technologies and particularly smart antenna array signal processing. To help maintain reliable spatial channels in an extremely dense frequency reuse pattern, the network uses time division duplex TDMA where uplink and downlink transmissions are always on the same frequency. In addition, because many user terminals are single antenna and transmit and receive omnidirectionally, except for the BCH, an uplink burst is always received before a downlink burst needs to be sent. This allows downlink bursts to be more accurately spatially directed. An uplink training sequence is embedded in every uplink burst to allow for moderately fast frequency hopping despite any decorrelation of the spatial channel with frequency.

The frequency hopping sequence may be any one of many different sequences well-known in the art. The parameters of the frequency hopping scheme are initially unknown to the user terminal. This maximizes the flexibility of the network and increases the flexibility of the user terminal. As explained below, the frequency hopping parameters are transmitted to the user in the CM burst.

The robustness of the frequency hopping scheme and the traffic capabilities of the system are improved if more frequency carriers can be allocated to the frequency hopping scheme. The BCH carrier is included as part of the frequency hopping scheme and, accordingly, used as a traffic channel. Since any one base station transmits a BCH burst only once per frame and since traffic is spatially directed to a particular user, a base station can transmit traffic channel data bursts during another base station's BCH burst without significantly adding interference to user terminals that are listening for BCH bursts on neighboring channels. Normally, the user terminal to which the traffic data burst is directed will not be listening for BCH bursts because it is already in a traffic session.

Because in the present embodiment there are 128 base stations each assigned to a different slot of the BCH, it is unlikely that the $128^{th}$ portion of the BCH that is assigned to any one particular base station will overlap with a particular channel in the frequency hopping traffic channel scheme while that channel is being used for traffic. However, if it does, the base station broadcasts its BCH burst at its assigned time, listens for CR messages at its assigned time and transmits CM bursts in its assigned slot. This ensures further consistent operation of the network. For a user terminal, however, the use of the BCH carrier as a BCH will interrupt its traffic channel session. As a result, instead of receiving a data packet burst from the base station, it will receive the BCH burst. Even if the user terminal does not recognize this burst as BCH, it will immediately recognize it as having an invalid format for the expected data packet. Accordingly, in the next uplink frame, it will send a data invalid DI message with its burst and the base station will send the earlier expected data packet in the next available frame in the traffic channel. In the present timing scheme, the same slot in the next frame will coincide with a Configuration Message slot for that base station. The same slot in the next frame will coincide with a different base station's assigned BCH slot. However, even if the second slot also overlaps with the base station's BCH assignment, the same protocol can apply again. The remote terminal will again send a DI message and after the assigned BCH slot has passed, the base station will send the expected data burst. By relying on the acknowledgment protocol, the data capacity of the network can be increased to include most of the BCH without increasing the complexity of the signaling or processing resources.

The amount of data capacity increase will depend on how much of the RF resources are dedicated to the BCH and how many base stations are in the system. If there are a small number of base stations in the system, so that the BCH frame has a very short repeat, the network can be configured so that every BCH slot is used for BCH, greatly reducing the amount of time for a remote user to acquire timing and synchronization and transmit a configuration request. Alternatively, the BCH can be configured so that only a small number of the possible 128 slots are used for BCH bursts and the rest of the channel capacity is left open for traffic. If there are a large number (i.e. close to 128) of base stations in the network, then it is unlikely that a user terminal will be able to receive BCH bursts from more than ten percent of the possible base stations. As a result, the remaining ninety percent of the carrier can be used for data traffic without affecting new user terminals scanning for BCH bursts. The base station can be programmed with the BSID or BSCC of the nearby base stations so that it also will not transmit traffic during the BCH slots assigned to those base stations. The same DI, retransmit scheme described above will compensate for any conflicts between neighboring BCH slots and the traffic channel.

Configuration Request CR

Figure 6:
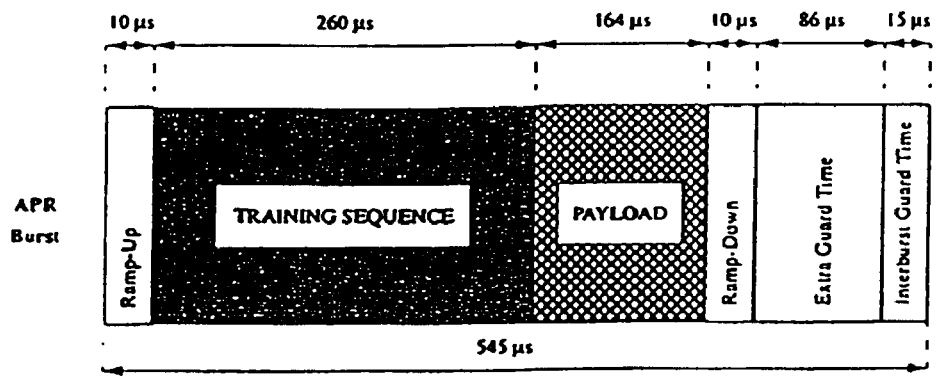
FIG. 6 is a diagram illustrating an example of a Configuration Request burst structure according to one embodiment of the present invention.

An example of a Configuration Request burst structure is shown in FIG. 6. CR bursts are distinguished from random access RA and traffic TCH bursts, in part, by a special CR spatial training sequence. The CR training sequence is longer than normal and has periodic properties that make finding timing alignment especially computationally efficient. The CR burst is shorter than a standard uplink data burst to allow for time-delay with unknown distance between the user terminal and base station. The CR burst is shortened by 86 μsec allowing an uncompensated time delay equivalent to a user terminal being about 15 km away from the base station.

The CR burst is transmitted from a user terminal at an unknown distance from the base station. Because of time-of-flight considerations, the user terminal time base is delayed relative to the base station. Furthermore, its CR transmission is also delayed because its timing advance is not yet initialized. Shortening the CR burst by 35 μsec allows it to arrive up to 35 μsec late without spilling over into the next time-slot. These 35 μsec mean that a user terminal 5300 meters from the base station can send a CR burst that will land completely within its time-slot. If this burst is seen by the base station, and replied to, the corresponding CM will contain a timing advance adjustment which will properly position subsequent data bursts.

Table 5 below summarizes the content of the example CR burst as shown in FIG. 6. The 82 information symbols are constructed from the configuration request message using modulation and coding.

TABLE 5

| Duration | Contents |
| --- | --- |
| 10 μsec | ramp-up |
| 260 μsec | training symbols $a_1, a_2, \ldots, a_{130}$ |
| 164 μsec | information symbols $h_1, h_2, \ldots, h_{82}$ |
| 10 μsec | ramp-down |
| 86 μsec | extra guard time |
| 15 μsec | inter-burst guard time |

CR spatial training is the same for all base stations and the base station does not necessarily know the location of the user terminal before receiving the CR. CRs are transmitted by user terminals at a fixed offset from BCH transmissions as shown in Table 3. The resulting time-multiplexed registration channel easily distinguishes CRs sent to different ones of several nearby base stations. Furthermore, CR and CM are scrambled by a function of BSCC ensuring that even if there is some interference from CRs sent to nearby base stations, the demodulation capture effect of the BSCC works out any collisions. In one embodiment, the scrambling is performed by taking the encoded bit sequence and exclusive OR'ing it with the output of a linear feedback shift register. Finally the smart antenna spatial resolution ability of the base station is applied to resolve any remaining ambiguities in received CRs.

A configuration request message is mapped onto a configuration request burst CR by the physical layer. A configuration message is mapped onto a standard downlink burst by the physical layer. The information symbols of the present CR burst are mapped out as shown in Table 6 below.

Any of the items listed below can be deleted and transmitted later during the registration cycle or not at all based on the needs of the system.

TABLE 6

| Configuration Request Message | |
| --- | --- |
| Field | # of Bits |
| identity | 8 |
| utClass | 4 |
| txPwr | 5 |
| Total | 17 | identity is a set of unique random bits for each user terminal that differentiate simultaneous messages from multiple user terminals. Because of the randomness and large number of bits, it is unlikely that two user terminals will select the same identity code at the same time.

utClass identifies user terminal capabilities (highest modulation class, frequency hopping capabilities, etc. ) This sequence identifies the type of user terminal that sent the CR. A palmtop digital assistant might have different capabilities than a desktop computer with a fixed dedicated antenna. With utClass, the different capabilities can be distinguished.

txPwr represents the power used by the user terminal to transmit the Configuration Request burst. For example, user terminal power=(2·txPwr−30) dBm.

CR is sent on the control carrier, as an example, exactly 2265 μsec after receipt of a downlink BCH burst. In this way, an otherwise uninitialized user terminal can send CR without any knowledge of the frequency hopping sequence parameters. The CR burst is shorter than a standard uplink time-slot to allow for unknown time-of-flight from the user terminal to the base station and typically arrives late in the uplink time-slot receive window.

Configuration Message CM

Figure 7:
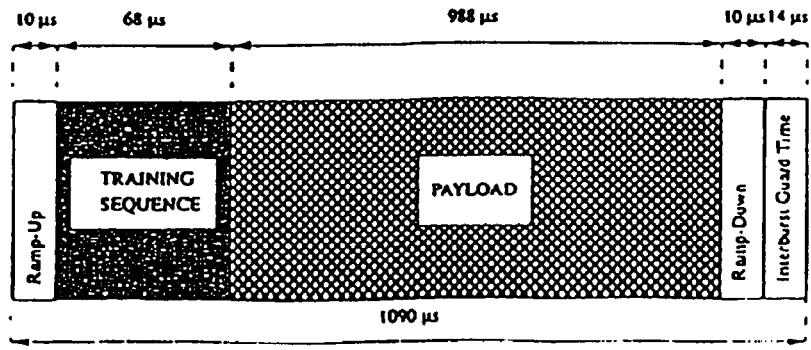
FIG. 7 is a diagram illustrating an example of a Configuration Message burst structure according to one embodiment of the present invention.

Table 7 below summarizes the content of an example Configuration Message burst as shown in FIG. 7. The 494 information symbols are constructed from the configuration message using modulation and coding.

TABLE 7

| Duration | Contents |
| --- | --- |
| 10 μsec | ramp-up |
| 68 μsec | training symbols $a_1, a_2, \ldots, a_{130}$ |
| 988 μsec | information symbols $h_1, h_2, \ldots, h_{494}$ |
| 10 μsec | ramp-down |
| 15 μsec | inter-burst guard time |

The configuration message CM burst is sent on the BCH carrier, exactly 5 msec after sending a downlink BCH burst, whenever CR was received on the corresponding uplink time-slot. Using this timing, CM is directed to the requesting user terminal. CM is also sent in a spatially directed signal based on the analysis of the spatial signaure, for example parameters, such as DOA and TOA of the uplink CR. Since CM is sent on the BCH carrier, a fixed time offset from BCH, an otherwise uninitialized user terminal can receive CM without any knowledge of the frequency hopping sequence parameters. CM, in response to CR, includes, among other things; the AFN (Absolute Frame Number), a larger timing-advance adjustment dynamic range, coarser power control, and various access control parameters. Table 8 below summarizes the content of the CM burst as shown in FIG. 7. Any of the items listed below can be deleted and transmitted later during the registration cycle or not at all based on the needs of the system.

TABLE 8

Configuration Message

| Field | # of Bits |
|---|---|
| identity | 8 |
| pwrCtrl | 4 |
| timingAdjust | 7 |
| AFN | 10 |
| carrierMask | 16 |
| racarrierMask | 16 |
| raslotMask | 3 |
| raDec | 3 |
| hopping | 1 |
| Total | 70 |

The meanings of the symbol sets are as follows:

identity: the random identity sent by the user terminal in the CR pwrCtrl: power offset that the user terminal should apply to future parameter request bursts and random access bursts: offset=$(2 \cdot pwrCtrl-16)$ dB.

timingAdjust: timing advance that the user terminal should apply to future random access bursts: timing advance=timingAdjust µs.

AFN: the 10 least significant bits of the Absolute Frame Number carrierMask: bitmap of carriers containing traffic channels racarrierMask: bitmap of carriers containing random access channels (least significant bit is carrier 0)

raslotMask: bitmap of slots containing random access channels (least significant bit is slot 1). Random access channels occur where both racarrierMask and raslotMask are nonzero.

raDec: AFNs available for random access channels.

hopping: if equal to 1 the relationship between physical and logical carriers hops each frame.

Configuration Message CM

Table 9 below summarizes the content of another example Configuration Message burst as shown in FIG. 7.

TABLE 9

| Duration | Contents |
|---|---|
| 10 µsec | ramp-up |
| 68 µsec | training sequence $a_1, a_2, \ldots, a_{34}$ |
| 32 µsec | FACCH symbols $g_1, g_2, \ldots, g_{16}$ |
| 920 µsec | information symbols $p_1, p_2, \ldots, p_{460}$ |
| 36 µsec | tail training sequence $h_1, h_2, \ldots, h_{18}$ |
| 10 µsec | ramp-down |
| 14 µsec | interburst guard time |

In one embodiment, the training sequence and the tail training sequence are known symbol sequences used for training, such as equalizer weight estimation, spatial parameter determination, synchronization, and so on. The F ACCH (Fast Access Control Channel) symbols may carry secondary data, such as power control, modulation class, and so on. In some embodiments, the F ACCH symbols may also be used for training, or to contain any data described as being contained in the information symbols below.

In one embodiment, the content the data contained in the information symbols of the example CM burst as shown in FIG. 7 can summarized by Table 9. Any of the items listed below can be deleted or transmitted later during the registration cycle or not at all based on the needs of the system.

TABLE 10

Configuration Message

| Field | # of Bits |
|---|---|
| Identity | 8 |
| PhysicalCarrierSet | 14 |
| Hopping | 1 |
| AFN | 10 |
| CarrierMask | 16 |
| RachLogical | 16 |
| Other CM fields | 40 |

In other embodiments, these fields may be ordered differently; the fields can be located anywhere on the CM burst. The fields may be any length, the above sizes are only one example. The fields do not need to be a continuous block of bits, but may be distributed in any way across the CM burst. The information contained in the fields are now described.

The Identity field contains an identifier of the user terminal that sent the CR burst to which the CM burst is sent in response. For, example, this can be the random identity sent by the requesting user terminal in the CR. In these embodiments, the Identity field is used to address the CM burst to the requesting user terminal. There are other ways to direct the CM to a particular user terminal, such as spatial beamforming and sending the CM burst in certain time-slots, that can be used instead of, or in addition to, addressing the CM burst to the requesting user terminal using the Identity field.

The PhysicalCarrierSet field contains the list of physical carriers allocated to the base station, i.e., the physical carrier set. This list or set of physical carriers may be different from a set used by neighboring base stations in order to avoid between neighboring base stations. The set of physical carriers are organized into logical channels by the base station and the user terminal. For example, a logical channel may consist of a time slot in a TDMA (Time Division Multiple Access) frame on a physical carrier. A TDMA frame may contain, for example, three downlink transmit time slots followed by three uplink receive time slots. A physical carrier may be a 625 kHz band around a central frequency, such as 800 MHz or 1.9 GHz. This band represents a physical carrier frequency used by the base station and its user terminals for communication. Furthermore, the logical channel may be organized using common duplexing techniques, such as FDD (Frequency Division Duplex), TDD (Time Division Duplex), and other common multiple access techniques, such as FDMA (Frequency Division Multiple Access), and CDMA (Code Division Multiple Access).

Logical channels may further be defined by a hopping function or hopping sequence. A hopping sequence indicates the sequence of resources used by a logical channel. Hopping sequences can hop among resources such as frequency, time, code or a combination of these. For example, in a network using frequency hopping, each base station periodically changes the physical carrier used to communicate on some logical channels. That is, a base station transmitting on a logical channel using one physical carrier from a physical carrier set at one time will use a different physical carrier at another time. In a TDMA system, the frequency hop may take place between frames, or may be more frequent, such as every TDMA time slot, or less frequent, such as every fifth frame.

Logical channels may not only hop frequency. They may also hop time slots, code, location, or a combination of all or some of these resources. For example, a logical channel may hop time slots. That is, the base station and the user terminal may switch time slots with each hop. For example, a base station transmitting on a logical channel using the first time slot of a TDMA frame may use a different time slot on a subsequent TDMA frame. Code may hop in a similar fashion. Also, multiple resources may hop simultaneously.

Hopping sequences are generally defined by hopping functions. For example, if the resource is frequency and there are four physical carriers indexed 0-3, the sequence 1,0,3,2 may be a hopping sequence. In other words at some time the frequency used by the logical channel is physical carrier 1. At some time in the future after one hop it is physical carrier 0, and so on. A mapping from the time to the frequency is a hopping function. For example, this hopping function, function F, maps time 4 to physical carrier 2. In other words, F(3)=2. Thus, a hopping function is just another way to express a hopping sequence. Since a hopping function uniquely defines a hopping sequence, the two phrases may be used interchangeably.

While the hopping function is a function of time, once hopping has begun, the base station and the user terminal do not need to exchange a time input, since the hopping is synchronized. However, to begin hopping, the user terminal may need a reference, such as a common counter. One such common counter is the AFN (Absolute Frame Number). The hopping may be a function of the AFN, or some portion of the AFN.

In one embodiment, the PhysicalCarrierSet field contains the indexes of the physical carriers available to the base station that are known at the user terminal. For example, the first seven bits of the PhysicalCarrierSet field can be used to give the index, i.e. the binary representation of a number between zero and 127, of the first physical carrier, and the second seven bits can be used to give the binary representation of a number of subsequent physical carriers that are allocated to the base station. Many other methods of communicating the list of physical carriers allocated to the base station exist.

The Hopping field indicates whether the base station uses frequency hopping over the physical carriers indicated by the PhysicalCarrierSet field. For example, if the Hopping field is 0no frequency hopping is used, and the logical channels used by the base station correspond to the available physical carriers indicated. However, if the Hopping field is I, some logical channels hop over the physical carriers in time. Since more precise information about hopping is included in the CarrierMask field described below, if the Hopping field indicates no hopping, the CarrierMask field may be ignored. As such, the Hopping field is optional and, in other embodiments, can be left out completely.

The AFN field contains some common counter, such as the 10 least significant bits of the Absolute Frame Number. In one embodiment, the hopping functions used by the logical channels are functions of the AFN field. The AFN field can be optional in embodiments in which the user terminal either has another input into the hopping functions, or does not need an input into the hopping functions. Furthermore, when the Hopping field indicates no hopping, the AFN field may also be ignored.

The CarrierMask field contains the list of physical carriers from the set indicated by the PhysicalCarrierSet field that are used for hopping. In other words, if a logical channel is using a physical carrier that is indicated by the CarrierMask field to be a carrier used for frequency hopping, then that logical channel is a hopping channel. In one embodiment, the hopping function to use on the logical channel is known by the user terminal, and is a function of the AFN field. There are many other ways to communicate information about what hopping sequences to use, including the BCH.

The CarrierMask field may be used in numerous ways to communicate the list of physical carriers that are used for hopping. For example, the CarrierMask field can be a bitmap of the lowest index carriers in the set indicated by the PhysicalCarrierSet field, where a 1 indicates that the carrier is, and a 0 that it is not, used for hopping. In such an embodiment, a CarrierMask field of, for example, 001 00000000 10000 would indicate that the physical carriers indexed by 2 and 11e.g. f2 and f11, are used for frequency hopping. There are many other ways to communicate information about which carriers are used for hopping.

The RachLogical field contains the list of physical carriers from the set indicated by the PhysicalCarrierSet field that may be used by the user terminal for random access. In one embodiment, the RachLogical field is a set of indexes for logical channels that may be used by the user terminal for random access, and the user terminal determines whether a certain logical channel hops, and if so, which carrier to use by observing the CarrierMask field and using the AFN to find the proper sequence of carriers indicated by the hopping function used by the logical channel. Random access is communication that is not on a channel specifically assigned to a user terminal. Thus, logical channels used for random access, i.e., random access channels (RACH), are contention channels. Random access (RA) bursts are typically used by a user terminal before the user terminal is assigned to a channel, for example, during registration.

Using the example above, the CarrierMask field is 0010000000010000indicating that the physical carriers indexed by 2 and 11e.g. $f_2$ and $f_{11}$, are used for frequency hopping. In this example, the RachLogical field is also a bitmap of the lowest index logical channels available for random access, and is 0110000000000000 in this example, indicating that logical channels indexed 1 and 2e.g. $ch_1$ and $ch_2$, may be used for random access. If the user terminal selects logical channel chi for random access, then the physical carrier indicated by the RachLogical field is the carrier indexed with 1e.g. $f_1$, since carrier $f_1$ is not used for hopping. That is, the logical channel using carrier $f_1$ does not hop, so the carrier to use for random access is carrier $f_1$. On the other hand, if the user terminal selects logical channel $ch_2$ for random access, then the physical carrier indicated by the RachLogical field will depend on the hopping function used by logical channel $ch_2$, since carrier $f_2$ corresponding with logical channel $ch_2$, is used for hopping. That is, the logical channel using carrier $f_2$ does hop, so the carrier to use for random access is determined by the user terminal using a hopping function and the AFN field.

There are many other ways to communicate information about which channels or carriers are available for random access. For example, in one embodiment, the first seven bits of the RachLogical field can be used to give the index, i.e. the binary representation of a number between zero and 127of the lowest index logical channel available for random access, and the second seven bits can be used to give the binary representation of a number of subsequent logical channels that are may be used for random access, with the last two bits of the RachLogical field reserved for other uses.

Figure 9:
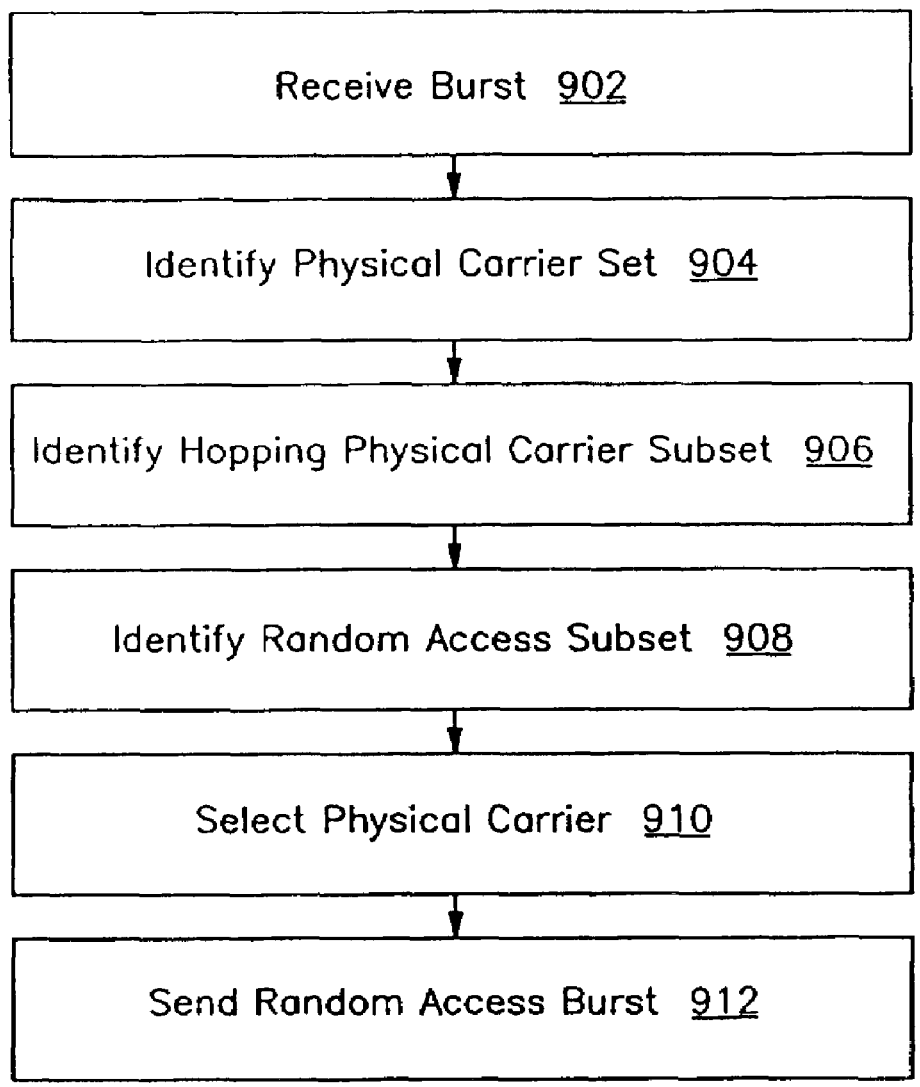
FIG. 9 is a flow chart of sending a random access burst according to one embodiment of the present invention.

An example embodiment of a user terminal using the CM burst to send a Random Access (RA) burst is now described with reference to FIG. 9. First, a CM burst is received at the user terminal. In one embodiment, the CM burst includes the fields summarized in Table 9. The Identity field may alert the user terminal that the CM burst is addressed to it. Using the PhysicalCarrierSet field, the user terminal then identifies 904 the physical carrier set, i.e., the physical carriers the user terminal can use to communicate with the base station. The user terminal also identifies 906 the physical carriers used for hopping, that is, the logical channels that hop, from the CarrierMask field. Furthermore, the user terminal identifies 908 the logical channels or physical carriers that may be used for RA, from the information in the RachLogical field.

Next, a random access physical carrier is selected 910 to be used to transmit a RA burst. In one embodiment, this is done by first selecting a logical channel from the channels indicated by the RachLogical field. Once this Random Access Channel (RACH) is selected, the index of the RACH is checked against the CarrierMask to determine whether the selected RACH is a hopping logical channel or not. In one embodiment, if the RACH is non-hopping, then the index of the RACH will correspond with the index of a physical carrier in the physical carrier set, and that carrier will be selected to be used by the RACH.

However, in one embodiment, if the RACH is determined to be a hopping logical channel, the physical carrier to use is selected using a hopping sequence and a common counter. The hopping sequence may be hardwired in the user terminal, or it may be communicated on the broadcast channel, in the CM burst, or in any other communications signal. In one embodiment, the common counter is the system-wide AFN, or some part of it, such as the least significant digits of the AFN contained in the AFN field. In this embodiment, the user terminal calculates the number of hops since the AFN. Then, starting with the physical carrier with the same index as the selected RACH, that number of hops are applied to the hopping sequence. The physical carrier indicated by the hopping sequence after the calculated number of hops is performed on the hopping sequence is the selected physical carrier. In other words, since the selected RACH already includes the sequence of carriers over time, the selected physical carrier can be the physical carrier used by the selected RACH.

After the physical carrier is selected, a RA burst is sent 912 on a channel using the selected RA physical carrier. In other words, the RA burst is sent on the selected RACH which is defined by the hopping sequence.

Selecting Random Access Channels

Figure 10:
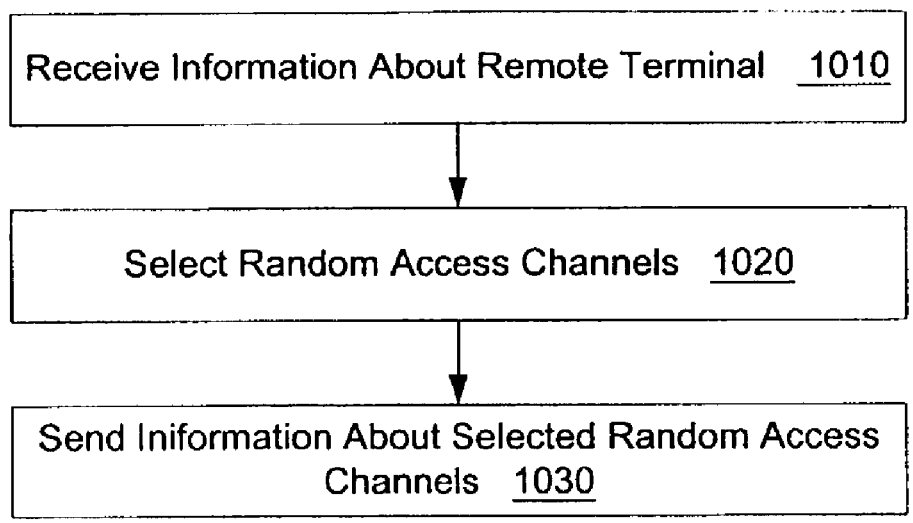
FIG. 10 is a flow chart of selecting random access channels according to one embodiment of the present invention.

As described above, the base station may use a CM burst to assign random access channels to user terminals. Embodiments for selecting the set of random access channels to assign to a particular user terminal are now described with reference to FIGS. 10 and 11. FIG. 10 is a flow chart of selecting random access channels according to one embodiment of the present invention. In FIG. 10, the base station receives 1010 some information about a remote terminal, for example in a CR burst described above. Then, the base station selects 1020 the random access channels the remote terminal should be allowed to use based on this information. Information about these selected random access channels, such as a description of the channels, as described above, is then sent 1030 from the base station to the remote terminal, for example in the CM burst.

Considering FIG. 10 in more detail, the base station receives 1010 information about a remote terminal. In one embodiment this information is contained in the Identity field of the CR burst, but it may be in other fields and transmitted using other signals. The information may be direct information, such as data directly interpreted by the base station, or indirect information such as a user identifier, which may require the base station to access a record associated with the remote terminal or some other record used to interpret or analyze the information. Thus, the information may be a codeword, e.g., "01101100" interpreted by the base station as "Subscription Level 4," or an identification (ID) of the remote terminal, such as "Terminal 134."

Then, the base station selects 1020 the random access channels (RACHs) to be assigned to the remote terminal. These channels may be selected from the set of all RACHs used by the base station, or any subset of these channels. The RACHs can include both hopping and non-hopping channels. The channels may be defined by any channelization scheme. The number of RACHs selected can range from one to all the RACHs used by the base station.

In one embodiment, the selection of the RACHs is based on the information received from the remote terminal. The selection procedure can therefore depend on the type of information received. For example, in one embodiment, the received information is a quality of service (QoS) level indicator. In this case, the information sent by the remote terminal may be indicating that the user of the terminal has a subscription level of 4. Such a level may in turn entitle the remote terminal to a certain number of RACHs, a set of RACHs with a maximum level of contention, a set of RACHs used by a maximum number of other terminals, or any other RACH privilege. In this case, the base station can select the RACHs to provide the level of quality subscribed for by the user of the remote terminal. For example, if the received information indicates that the user terminal has a subscription level of 2 then the base station selects two RACHs for assignment to the remote terminal, but if the subscription level is 4, then the base station selects four RACHs.

The received information need not be a direct indicator of the subscription level. For example, if the received information is a user terminal ID (UTID), the information may be communicated indirectly. For example, the user terminal may send a network-wide unique UTID. Then, the base station may access some record associated with the UTID that may include, among other information, the subscription level of the remote terminal and thus the corresponding QoS to be provided. The RACH can then be selected to provide the QoS as set forth above. The UTID need not be unique network-wide. It may be more unique, e.g. universally unique, or less unique, e.g. unique only at the base station. It may be a randomly assigned dynamic ID, other dynamic ID such as an ISP logon, or a static ID given to the remote terminal on creation, e.g. a serial number.

In another embodiment, the received information is a capability indicator. For example, the information sent by the remote terminal can be indicate that the terminal is or is not able to perform frequency hopping. In this case, if the received information indicates that the user terminal is capable of frequency hopping, then the base station may select RACHs that hop in frequency as set forth above. On the other hand, if the received information indicates that the user terminal is not capable of frequency hopping, then the base station selects only non-hopping RACHs. Again, the received information need not be a direct indicator of the capabilities of the remote terminal, but a UTID associated with a record accessible to the base station that includes the hopping capability information along with other information.

In yet another embodiment, the received information is a device type indicator. For example, the information sent by the remote terminal can indicate that the terminal is a cellular phone. Similarly, the information can indicate that the remote terminal is a broadband wireless web-device, a narrowband wireless web-device, a personal digital assistant (PDA), a push-and-talk device, a laptop computer, a voice device, a data device, and a voice-and-data device, or any other device classification that is implemented in the system. Such indication can be used, for example, to use different numbers of RACH for circuit-switched devices, such as cellular phones, than for packet-switched devices, such as PDAs.

For example, if the received information indicates that the user terminal is a cellular phone, then the base station may select RACHs that are reserved by the base station for cellular phones. On the other hand, if the received information indicates that the user terminal is a wireless web-device, then the base station selects RACHs reserved for such devices. Again, the received information need not be a direct indicator of the type of device the remote terminal is, but may be a UTID associated with a record accessible to the base station that includes the device classification of the remote terminal.

In yet another embodiment, the base station can use the received information to assign the user terminal to a particular partition. A partition may be a physical hardware partition, such as a modem board, or it may be a logical partition of the physical resources of the base station. For example, each modem board of the base station may represent a partition. Then, the information sent by the remote terminal can be used by the base station to assign the terminal to modem board 2. In this case, the base station selects RACHs that are reserved for use by modem board 2. On the other hand, if the information sent by the remote terminal may cause the base station to assign the terminal to modem board 3, for example because the information indicates that the terminal is a laptop and laptops are serviced on modem board 3. Again, the received information need not be a direct indicator of the partition that the remote terminal is associated with, but may be a UTID that the base station assigns to a partition according to some scheme. For example, for load balancing between four partitions labeled 1-4 the base station may assign user terminals with UTID 0-63 to partition 1, terminals with UTID 64-127 to partition 2, terminals with UTID 128-191 to partition 2, and terminals with UTID 192-255 to partition 4.

The four example embodiments of selecting 1020 the random access channels are described to clarify the selection process and to point out that numerous possible embodiments exist for selecting random access channels based on information about a remote terminal. Furthermore, several of the example embodiments may be combined with each other. For example, the received information may contain both a QoS indicator and a capability indicator either directly or indirectly.

After the RACHs have been selected, information about the selected RACHs is sent 1030 to the remote terminal. That is, the remote terminal is informed of the channels assigned to it by the base station that it can use for random access. The information about the selected RACHs can be any description enabling the remote terminal to use the selected RACHs. Some example embodiments of providing the RACHs to the remote terminal are described above with reference to Table 9 and the example CM burst.

Demonstrative Example

Figure 11:
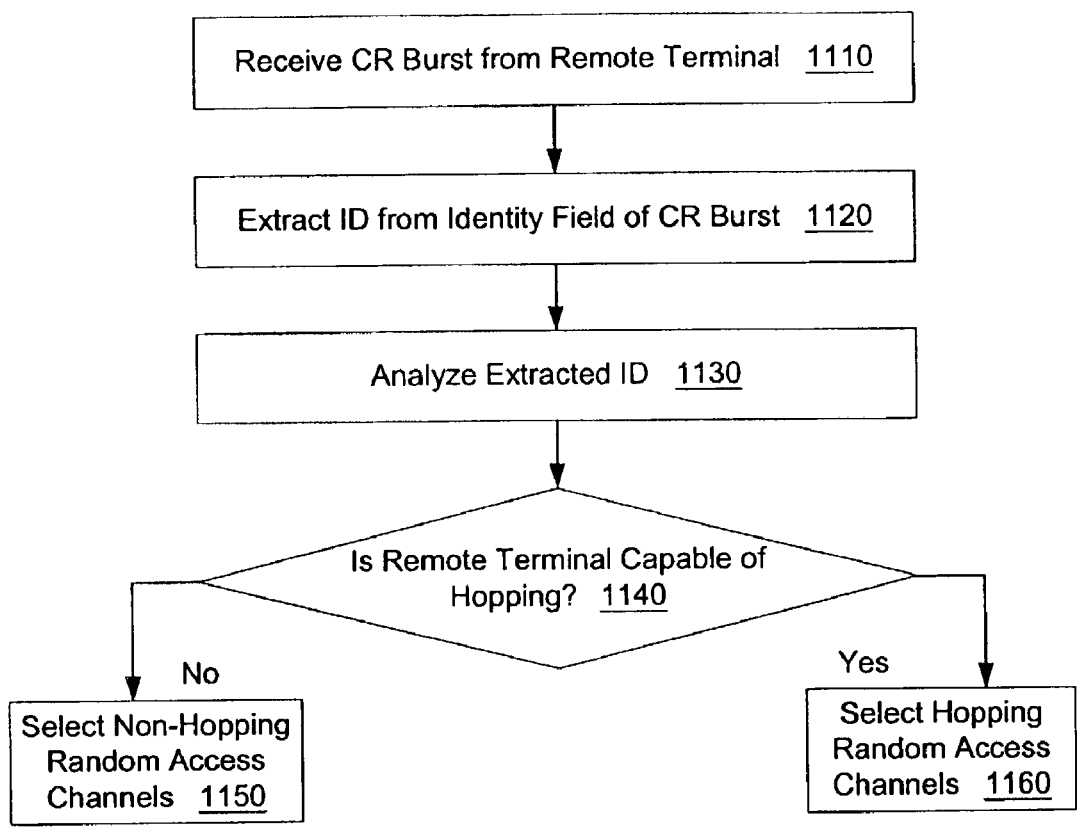
FIG. 11 is a flow chart of selecting random access channels according to embodiment of the present invention.

To aid in understanding at least on embodiment of the present invention, a specific example is described below with reference to FIG. 11. The invention is not limited to this specific example. In this example, upon arrival at a base station, a remote terminal tunes to a broadcast channel (BCH) that provides basic information about the system, and begins registration by sending a configuration request (CR) burst to the base station. The CR is in the form shown in Table 6 and includes an eight-bit Identity field. An eight-bit field can represent an ID between 0 and 255 inclusive, and in this example system, having an ID over 100 means that the remote terminal is capable of frequency hopping.

The base station receives 1110 the CR burst from the remote terminal, and extracts 1120 the ID contained in the Identity field of the CR burst by demodulating and decoding the CR burst. Next, the base station analyzes 1130 the extracted ID to determine whether the remote terminal is capable of hopping. For example, the base station may compare the extracted ID to an internal memory device storing a record that shows the Ids that indicate hopping capability. In this embodiment, this record would indicate hopping capability for an ID of 120 but would indicate an incapacity to hop for an ID of 85. In this example, this record is stored in the base station. However, such information may also be stored at a central switching office that maintains information on active subscriptions. Such a central office can be coupled to the base station through Ethernet, although other communications systems can be used.

Using the analysis to determine 1140 whether the remote terminal is able to hop or not, the base station selects random access channels based on the determination. That is, if the remote terminal is not capable of hopping, then the base station selects 1150 RACHs from a subset of all the available RACHs that do not include hopping channels. On the other hand, if the remote terminal can hop, then the base station can select 1160 RACHs from a subset of the available RACHs that only include hopping channels, or from any available RACHs. The selected RACHs are then communicated to the remote terminal using the CM burst, and the remote will use the selected channels when sending random access bursts.

In this embodiment, selecting the channels to be used for random access has been described in the context of the registration of a remote terminal at a base station. However, RACHs can be assigned and re-assigned at any time before or during a connection. That is, after the selected RACHs are assigned to the remote terminal, a new set of RACHs can be selected by the base station according to an embodiment of the present invention. Then, this new set of RACHs can be communicated to the remote terminal, which, from that time forward will use the new RACH set to send random access bursts.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 to 4, or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless internet data system for portable handsets, it can be applied to a wide variety of different wireless systems in which data must be exchanged. Such systems include voice, video, music, broadcast and other types of data systems without external connections. The present invention can be applied to fixed remote terminals as well as to low and high mobility terminals. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

The invention claimed is:

1. A method comprising:
   receiving a signal from a second radio at a first radio, the received signal containing information identifying the second radio, wherein the information identifying the second radio includes capability information about at least one hardware capability of the second radio, wherein the at least one hardware capability includes an indication whether the second radio is capable of hopping;
   selecting one or more channels to be used by the second radio for random access to the first radio using the information identifying the second radio, wherein selecting the one or more channels comprises selecting one or more channels that do not include any channels that hop, if the received capability information indicated that the second radio is not capable of hopping; and
   sending a signal from the first radio to the second radio, the sent signal containing information about the selected one or more channels.

2. A method comprising:
   receiving a signal from a second radio at a first radio, the received signal containing information identifying the second radio, wherein the information identifying the second radio includes quality of service information indicating a level of service to be provided to the second radio, wherein the level of service includes a maximum level of contention on channels to be used by the second radio for random access;
   selecting one or more channels to be used by the second radio for random access to the first radio using the information identifying the second radio; and
   sending a signal from the first radio to the second radio, the sent signal containing information about the selected one or more channels.

3. The method of claim 2, wherein selecting the one or more channels comprises selecting one or more channels that have a level of contention at or below the indicated maximum level.

4. A communications device comprising:
   a receiver to receive a signal from a radio, the received signal containing information identifying the radio including capability information about at least one hardware capability of the radio;
   a processor coupled to the receiver to select one or more channels to be used by the radio for random access to the communications device using the information identifying the radio, wherein the processor selects the one or more channels by selecting one or more channels that do not include any channels that hop, if the received capability information indicates that the radio is not capable of hopping; and
   a transmitter coupled to the processor to send a signal to the radio, the sent signal containing information about the selected one or more channels.

5. A communications device comprising:
   a receiver to receive a signal from a radio, the received signal containing information identifying the radio including quality of service information indicating a level of service to be provided to the radio, wherein the level of service includes a maximum level of contention on channels to be used by the radio for random access;
   a processor coupled to the receiver to select one or more channels to be used by the radio for random access to the communications device using the information identifying the radio; and
   a transmitter coupled to the processor to send a signal to the radio, the sent signal containing information about the selected one or more channels.

6. The communications device of claim 5, wherein the processor selects the one or more channels by selecting one or more channels that have a level of contention at or below the indicated maximum level.

7. The communications device of claim 6, wherein the communications device type comprises at least one of a cellular phone, a broadband wireless web-device, a narrowband wireless web-device, a personal digital assistant (PDA), a push-and-talk device, a voice device, a data device, and a voice-and-data device.

8. The communications device of claim 6, wherein the processor selects the one or more channels by selecting one or more channels designated to be used for random access by devices characterized by the communications device type.

9. The communications device of claim 8, wherein the processor selects the one or more channels by selecting one or more channels being serviced using the partition associated with the radio.

10. A machine-readable medium having stored thereon data representing instructions that, when executed by a processor of a first radio, cause the processor to perform operations comprising:
    receiving a signal from a second radio at the first radio, the received signal containing information identifying the second radio including capability information about at least one hardware capability of the second radio, wherein the at least one hardware capability includes an indication whether the second radio is capable of hopping;

selecting one or more channels to be used by the second radio for random access to the first radio using the information identifying the second radio, wherein selecting the one or more channels comprises selecting one or more channels that do not include any channels that hop, if the received capability information indicated that the second radio is not capable of hopping; and sending a signal from the first radio to the second radio, the sent signal containing information about the selected one or more channels.

11. A machine-readable medium having stored thereon data representing instructions that, when executed by a processor of a first radio, cause the processor to perform operations comprising:

receiving a signal from a second radio at the first radio, the received signal containing information identifying the second radio including quality of service information indicating a level of service to be provided to the second radio, wherein the level of service includes a maximum level of contention on channels to be used by the second radio for random access;

selecting one or more channels to be used by the second radio for random access to the first radio using the information identifying the second radio; and sending a signal from the first radio to the second radio, the sent signal containing information about the selected one or more channels.

12. The machine-readable medium of claim 11, wherein selecting the one or more channels comprises selecting one or more channels that have a level of contention at or below the indicated maximum level.

\* \* \* \* \*